United States Patent [19]

Ashikawa et al.

[11] Patent Number: 4,618,021
[45] Date of Patent: Oct. 21, 1986

[54] DRIVING GEAR FOR FRONT AND REAR WHEELS OF AUTOMOBILE

[75] Inventors: Noboru Ashikawa, Sayama; Shunji Sakuma, Wako, both of Japan

[73] Assignee: Honda Giken Kogyo Kabushiki Kaisha, Tokyo, Japan

[21] Appl. No.: 568,842

[22] Filed: Jan. 6, 1984

[30] Foreign Application Priority Data

Jan. 18, 1983 [JP] Japan ................................. 58-6233

[51] Int. Cl.⁴ .......................................... B60K 17/344
[52] U.S. Cl. ........................................ 180/248; 74/710
[58] Field of Search ............... 180/248, 249, 250, 247, 180/233; 74/701, 695, 714, 705, 710

[56] References Cited

U.S. PATENT DOCUMENTS

| | | | |
|---|---|---|---|
| 4,417,642 | 11/1983 | Suzuki et al. | 180/249 |
| 4,431,079 | 2/1984 | Suzuki | 180/247 |
| 4,441,575 | 4/1984 | Suzuki | 180/248 |
| 4,476,953 | 10/1984 | Hiraiwa | 180/247 |

FOREIGN PATENT DOCUMENTS 2035930  6/1980  United Kingdom ................ 180/248

Primary Examiner—Craig R. Feinberg
Assistant Examiner—David A. Okonsky
Attorney, Agent, or Firm—Armstrong, Nikaido, Marmelstein & Kubovcik

[57] ABSTRACT

In a driving gear for front and rear wheels of automobile, comprising an engine with a crank shaft disposed in the direction of width of the car body, a transmission means supported on an engine case at one side axially of said crank shaft, a clutch provided between the engine and the transmission, a first differential gear coupled to the transmission, a second differential gear transmitting one output of the first differential gear to left and right wheels on the front or rear, a third differential gear transmitting the other output of the first differential gear to left and right wheels on the rear or front, the improvement wherein the first differential gear is of planetary gear type, the second differential gear is of bevel gear type, both the first and second differential gears are provided on both sides of a position corresponding to said clutch on the same axis parallel to said crank shaft.

4 Claims, 3 Drawing Figures

DRIVING GEAR FOR FRONT AND REAR WHEELS OF AUTOMOBILE

BACKGROUND OF THE INVENTION

This invention relates to a driving gear for front and rear wheels of automobile, comprising an engine with a crank shaft disposed in the direction of width of the car body, a transmission supported on an engine case at one side axially of said crank shaft, a clutch provided between the engine and the transmission, a first differential gear coupled to the transmission, a second differential gear transmitting one output of the first differential gear to left and right wheels on the front or rear, a third differential gear transmitting the other output of the first differential gear to left and right wheels on the rear or front.

SUMMARY OF THE INVENTION

The object of this invention is to provide a driving gear for front and rear wheels of automobile, which is miniaturized reasonably by contriving constitution and arrangement of the first differential gear and the second differential gear accordingly.

In the driving gear for front and rear wheels of automobile according to this invention, the first differential gear is of planetary gear type, the second differential gear is of bevel gear type, and both the first and second differential gears are provided on both sides of a position corresponding to a clutch on the same axis parallel to a crank shaft.

According to this invention, the first differential gear is constituted of a planetary gear type which requires a comparatively large space in a diametrical direction but only a small space in an axial direction, so that the width along the axis of crank shaft can be reduced. Moreover, the second differential gear is constituted of a bevel gear type which requires a comparatively large space axially but is small in diameter, therefore the amount of projection rearward of an engine can be minimized. Further, since the first and second differential gears are disposed on both sides of a position corresponding to the clutch on the same axis parallel to the axis of the crank shaft, the first and second differential gears can be arranged at a position close to the clutch side, thus attaining miniaturization of the driving gear.

BRIEF DESCRIPTION OF THE DRAWINGS

The above and other objects and the attendant advantages of the present invention will become readily apparent by reference to the following detailed description when considered in conjunction with the accompanying drawings wherein.

The accompanying drawings illustrate one embodiment of the present invention, wherein.

DESCRIPTION OF PREFERRED EMBODIMENT

Figure 1:
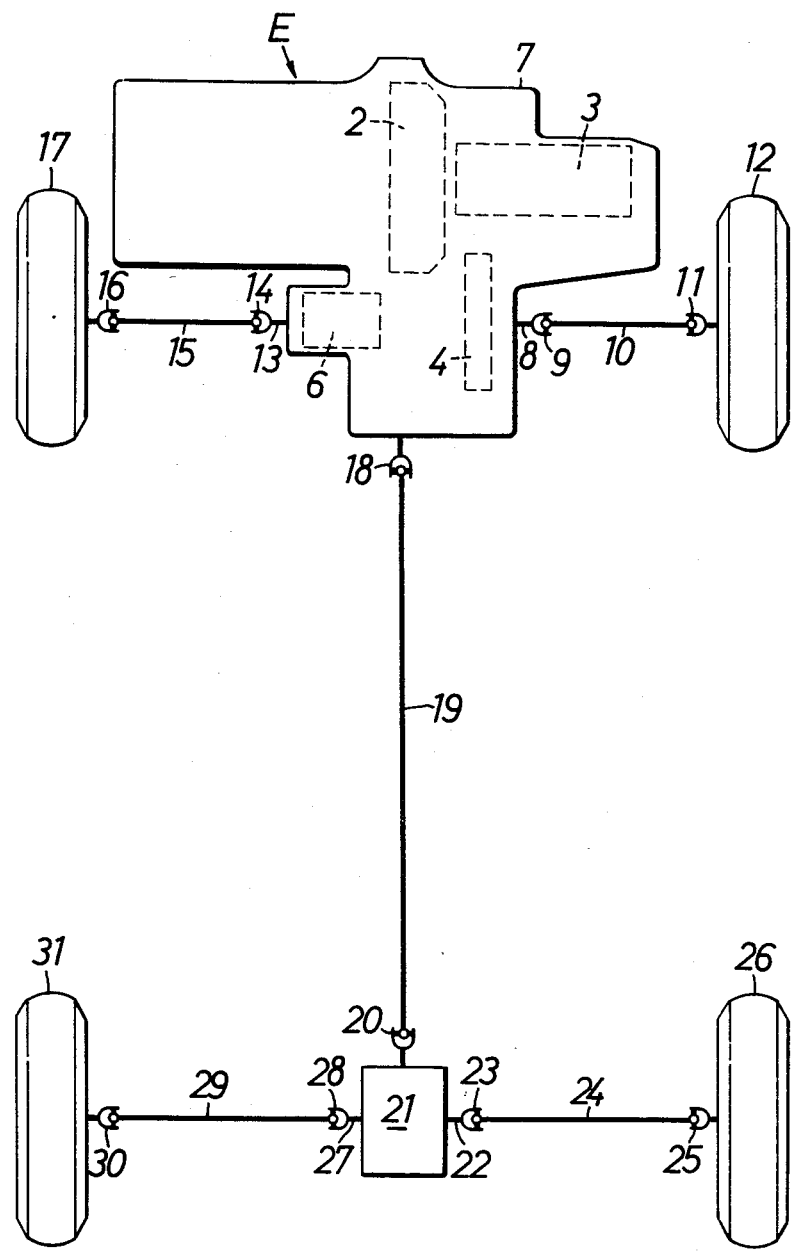
FIG. 1 is a schematic view showing the overall driving system in the form of skeleton.

Hereinafter, one embodiment of the present invention will be described with reference to the accompanying drawings. Referring initially to FIG. 1, the engine E is shown mounted transversely to the front part of the car body, that is, a crank shaft 1 (see FIG. 2) is disposed in the direction of width of the car body. A transmission means 7 equipped with a clutch 2, a transmission 3, a first differential gear 4, a second differential gear 6 and the like is supported at one side of the engine E that corresponds to the end portion of the crank shaft 1, in such a fashion as to protrude outward in the axial direction of the crank shaft 1. The driving force of the engine E is transmitted to the first differential gear 4 through the clutch 2 and the transmission 3, and from the first differential gear 4 to the second differential gear 6. The driving force from this second differential gear 6 is transmitted to a front wheel 12 on the right through a driving shaft 8, a universal joint 9, a driving shaft 10 and a second universal joint 11 and also to a front wheel 17 on the left through a driving shaft 13, a universal joint 14, a driving shaft 15 and another universal joint 16. The driving force of the engine E is also transmitted to a propeller shaft 19 from the first differential gear 4 through a universal joint 18 and the rotating driving force of this propeller shaft 19 is applied to a third differential gear 21 through a universal joint 20, from thence to a rear wheel 26 on the right through one of the driving shafts 22 connected to the third differential gear 21, a universal joint 23, a driving shaft 24 and a universal joint 25 as well as to a rear wheel 31 on the left through the other driving shaft 27, a universal joint 28, a driving shaft 29 and a universal joint 30. Thus, the engine E drives the front wheels 12, 17 and rear wheels 26, 31 on the right and left.

Figure 2:
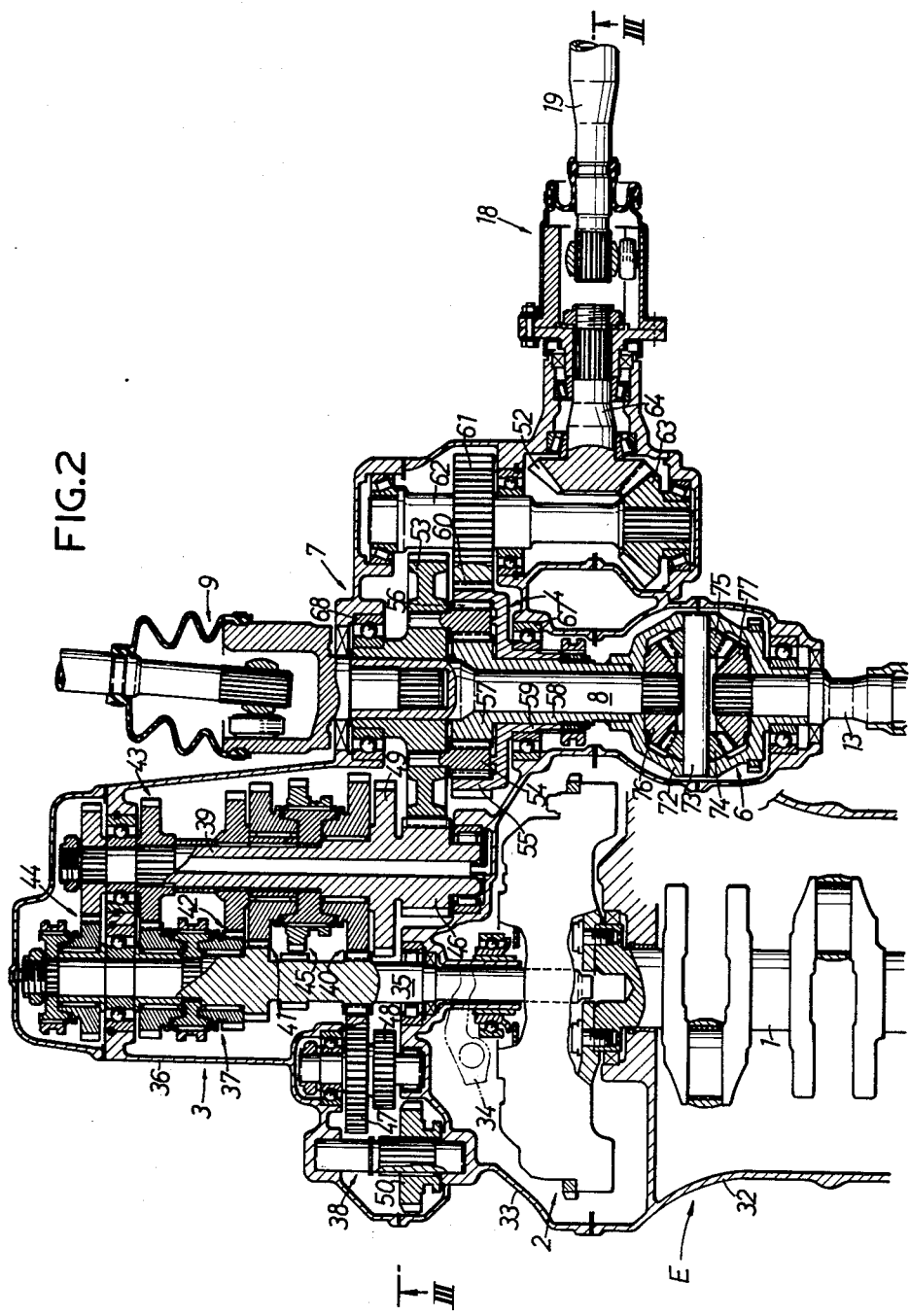
FIG. 2 is a transverse sectional view showing in detail the transmission gear this view being partly developed for clear illustration of the gears.

Referring to FIG. 2 which illustrates in detail the transmission means 7, the clutch 2 is shown in a clutch case 33 which is integral with the engine case 32. The crank shaft 1 is connected to the input shaft 35 of the transmission 3 when the clutch 2 becomes operative due to the inactuation of a release arm 34.

Figure 3:
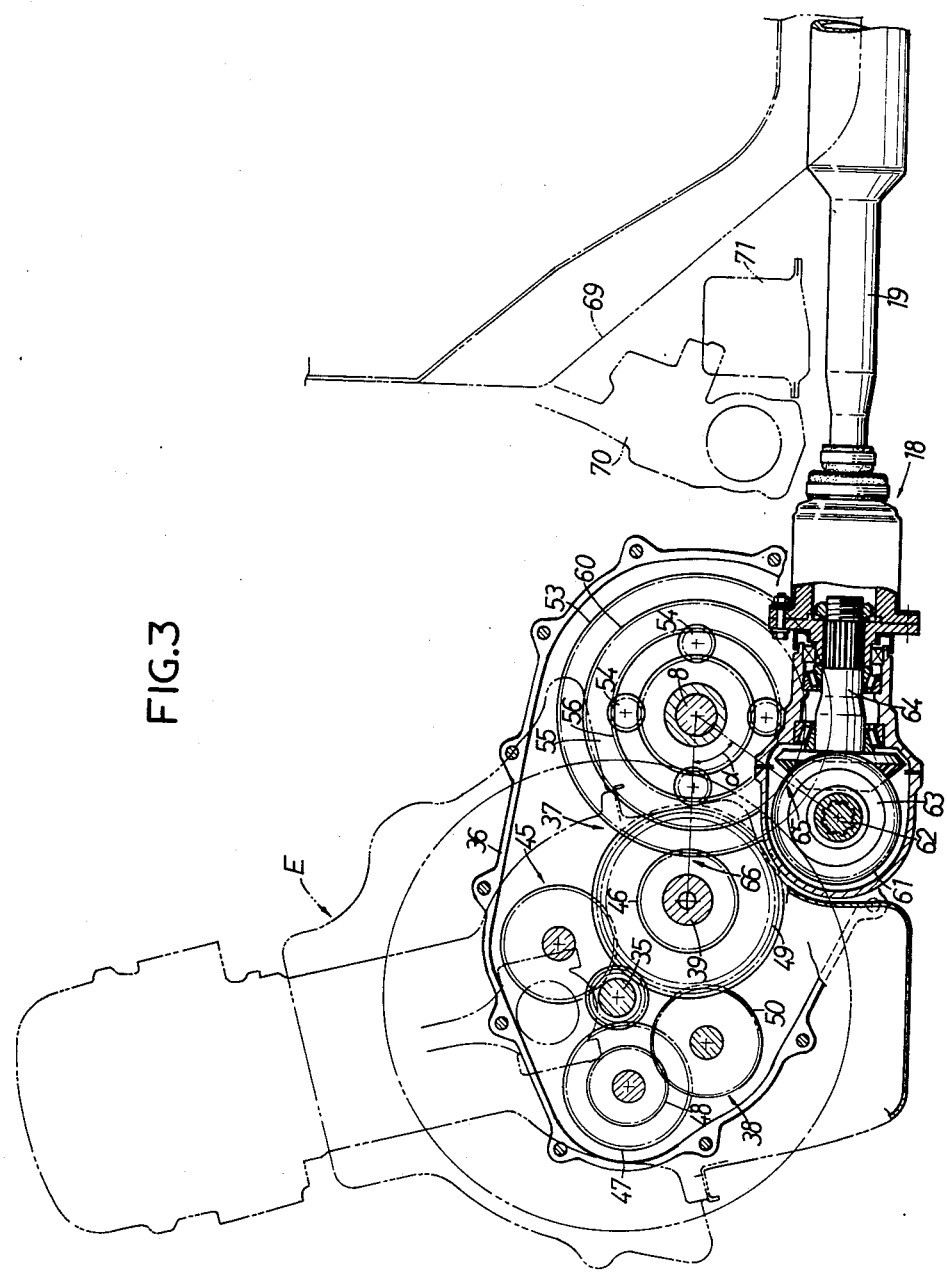
FIG. 3 is a simplified sectional view taken along line III—III of FIG. 2.

Referring also to FIG. 3, the transmission 3 is shown placed in a transmission case 36 which is integral with the clutch case 33, and is equipped with a main transmission mechanism 37 and a subtransmission mechanism 38. The main transmission mechanism 37 ncludes the afore-mentioned input shaft 35 having the same axis as that of the crank shaft 1, an output shaft 39 parallel the input shaft 35 and gear trains 40 through 45 for the first through fifth speeds and for reverse, respectively, that are interposed between the input and output shafts 35, 39. The driving force that is transmitted from the input shaft 35 to the output shaft 39 through the selected gear train of these gear trains 40-45 is outputted from an output gear 46 disposed at the end of the output shaft 39 on the engine side.

The sub-transmission mechanism 38 includes a first idle gear 47 parallel to the input shaft 35, a second idle gear 48 coaxial with the first idle gear 47, a driven gear 49 disposed on the output shaft 39 at a position close to the output gear 46, and a mesh and mesh-release gear 50 common to the second idle gear 48 and the driven gear 49. This mechanism is used for the low speed operation of below the first speed.

The transmission means 7 has a relatively large weight and moreover, is cantilevered to the clutch case 33 which is integral with the engine case 32. In such a cantilever support structure, the major proportion of the weight should be arranged as close as possible to the engine side in order to reduce the rigidity of the transmission case 36 and that of the engine case 32 to which the former is fitted, and thus to reduce the overall weight. Accordingly, if the output gear 46 and the driven gear 49 having relatively large weights are disposed at the position close to the end of the output shaft 39 near the engine E, the sub-transmission mechanism 38 can be disposed close to the engine E. In consequence, the weight distribution of the transmission means 7 can be shifted towards the engine E. It is thus possible to form the transmission case 36 and the engine case 32 as having a relatively thin thickness to reduce the rigidity required by those cases and eventually, to reduce the overall weight of the engine including the transmission means 7.

The output gear 46 meshes with a reduction gear 53 which is rotatable around the driving shaft 8 parallel to the output shaft 39 at the rear of the transmission 3. Both output and reduction gears 46, 53 are helical gears. Planet gears 54 are pivotally supported at four positions in the circumferential direction of the reduction gear 53 and these planet gears 54 mesh the inner gear 56 of a ring gear 55 and with a sun gear 57, respectively, thereby forming the first differential gear 4. The sun gear 57 is disposed integrally with an inner cylinder 58 encompassing the outer circumference of the driving shaft 8 while the ring gear 55 is disposed integrally with an outer cylinder 59 encompassing the outer circumference of the inner cylinder 58.

The outer gear 60 of the ring gear 55 has a helical shape and meshes with a gear 61 which is also a helical gear. The gear 61 is disposed integrally with a rotary shaft 62 which is parallel to the driving shaft 8. A bevel gear 63 is further disposed integrally with this rotary shaft 62. This bevel gear 63 meshes with another bevel gear 52 which is disposed integrally with a rotary shaft 64 extending in a direction at right angles with respect to the rotary shaft 62. The rotary shaft 64 is connected to the propeller shaft 19 via the universal joint 18. Accordingly, the direction of the driving force from the first differential gear 4 is converted at right angles to the crank shaft 1 via the gear 61 and the bevel gears 63, 52 and the driving force is then transmitted to the propeller shaft 19.

Here, the mesh state between the output gear 46, the reduction gear 53, the outer gear 60 of the ring gear 55 and the gear 61, that are the helical gears, will be explained with reference to FIG. 3. The mesh portion between the outer gear 60 of the ring gear 55 and the gear 61 is closer to the engine E than the axis of the driving shaft 8, so that the center angle α described between the mesh portion 66 of the output gear 46 with the reduction gear 53 and the mesh portion 65 described above can be minimized, preferably below 90°. In other words, since thrust force acts upon the mesh portion of the helical gears, mutually opposing forces will act upon both mesh portions 65, 66 along the axis of the driving shaft 8 if the output gear 46 and the gear 61 are positioned on the opposite sides to each other with respect to the driving shaft 8, whereby bending moment will act upon the driving shaft 8. In such a case, the strength of the driving shaft 8 as well as the strength of bearings 67, 68 supporting the driving shaft 8 must be increased. However, since both mesh portions 65, 66 are positioned close to each other as described above, the thrust forces occurring at the mesh portions 65, 66 offset each other and the bending moment acting upon the driving shaft 8 can be reduced. Hence, the strength of the driving shaft 8 and bearings 67, 68 need not be increased. This is advantageous for strength design.

Since the mesh portion 65 is shifted towards the engine E, a sufficient space can be secured at the rear of the transmission means 7, that is, between the transmission means 7 and a dashboard represented by two-dot-chain line as can be seen clearly from FIG. 3. This space can be used for arranging a steering mechanism 70, a leadbeam 71 and the like. Thus, the cabin of the vehicle can also be enlarged.

The second differential gear 6 has the same axis as the first differential gear 4 and is disposed in such a manner as to interpose the clutch case 33 between both differential gears 4, 6. In the second differential 6, the driving shafts 8, 13 are disposed inside the gear box 72 so as to face each other while sharing the same axis. A support shaft 73 crossing at right angles to the driving shafts 8, 13 is fixed to the gear box 72 between both driving shafts 8, 13. The gear box 72 is integrally fixed to the inner cylinder 58 of the first differential gear 4, and bevel gears 74, 75 are fixed to the support shaft 73. The driving shafts 8, 13 penetrate turnably through the gear box 72 and bevel gears 76, 77 meshing with the bevel gears 74, 75 described above are fixed at the end portions of these driving shafts, respectively.

As described above, the first differential gear 4 for driving the front and rear wheel driving systems and the second differential gear 6 for driving the front wheels are disposed on the same axis via the shaft 8. The first differential gear 4 is of the planet gear type with the second differential gear 6 being of the bevel gear type. This makes the overall construction compact. In other words, since the first differential gear 4 is disposed outside the crank shaft 1 of the engine E, its diameter can be made relatively large. Since it is of the planet gear type which occupies a relatively large space in the radial direction, but needs only a limited space in the axial direction, it contributes to the reduction of the width of the transmission means 7 in the axial direction of the crank shaft 1. Due to its arrangement, the second differential gear 6 is disposed at the rear of the engine E and hence, its diameter can not be increased easily. However, its width can be increased and hence, a relatively large width is necessary in the axial direction, but since the differential gear 6 is of the bevel gear type having a relatively small diameter, the amount of projection of the transmission means 7 to the back of the engine E can be reduced. As a result, the transmission means 7 can be made compact as a whole. Moreover, each planet gear 54 of the first differential gear 4 is directly and pivotally supported by the reduction gear 53. The distance between the second differential gear 6 and the reduction gear 53 can be reduced. This also helps reduce the size of the transmission means 7.

The third differential gear 21 (see FIG. 1) is of the bevel gear type having the same construction as the second differential gear 6 and hence, the detailed explanation is hereby omitted.

Next, the operation of this embodiment will be explained briefly. The driving force of the engine E is transmitted from the crank shaft 1 to the input shaft 35 of the transmission 3 through the clutch 2 and then to the output shaft 39 through either the gear train of any of the transmission stages of the main transmission mechanism 37 or the sub-transmission mechanism 38. The driving force from the output shaft 39 is transmitted from the output gear 46 to the reduction gear 53 and then the driving force is divided by the first differential gear 4 to the sun gear 57 and to the ring gear 55. The transmission force transmitted the sun gear 57 is transmitted to the right and left front wheels 12, 17 through the second differential gear 6. The driving force transmitted to the ring gear 55 is transmitted to the right and left rear wheels 20, 31 through the gear 61, the bevel gears 63, 52, the universal joint 18, the propeller shaft 19 and the third differential gear 21.

Incidentally, the sub-transmission mechanism 38 can be constructed for the high speed use of the fifth or higher stages, instead of the low speed use for the first speed or below described above by the provision of appropriate gears.

It is readily apparent that the above-described embodiment meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A driving gear for front and rear wheels of an automobile, comprising an engine with a crank shaft disposed in a direction of width of a body of the automobile, a transmission supported on an engine case at one side axially of said crank shaft, a clutch provided between the engine and the transmission, a first differential gear of a planetary gear type coupled to the transmission via a reduction gear, a second differential gear of a bevel gear type transmission an output of the first differential gear to left and right front wheels of the automobile, a third differential gear transmitting an output of the first differential gear to left and right rear wheels of the automobile, wherein the first differential gear is disposed adjacent to said reduction gear and comprises a sun gear, a ring gear and a plurality of planet gears engaging with the sun and ring gears, said planet gears being pivoted directly on and driven by said reduction gear; the first and second differential gears are provided on opposite sides of a plane perpendicular to said crankshaft and including said clutch, said first and second differential gears also lying along a common axis parallel to said crank shaft; the sun gear and the ring gear are coupled individually to said front and rear wheels respectively.

2. A driving gear as defined in claim 1, wherein said first differential gear and said reduction gear are disposed rearward of said transmission and said second differential gear is disposed rearward of said engine.

3. A driving gear as defined in claim 1, wherein in a driving line leading to the rear left and right wheels there is provided a rotary shaft extending parallel to a driving shaft on which said first differential gear is mounted, a gear mounted on said rotary shaft and meshing with said ring gear, a first bevel gear mounted on a portion of the rotary shaft near the second differential gear and a second bevel gear meshing with the first bevel gear and mounted on another rotary shaft extending in a direction at right angles to said rotary shaft.

4. A driving gear as defined in claim 2, wherein in a driving line leading to the rear left and right wheels there is provided a rotary shaft extending parallel to a driving shaft on which said first differential gear is mounted, a gear mounted on said rotary shaft and meshing with said ring gear, a first bevel gear mounted on a portion of the rotary shaft near the second differential gear and a second bevel gear meshing with the first bevel gear and mounted on another rotary shaft extending in a direction at right angles to said rotary shaft.

* * * * *